US006839760B1

(12) United States Patent
Walters

(10) Patent No.: US 6,839,760 B1
(45) Date of Patent: Jan. 4, 2005

(54) METHOD FOR PREVENTING DEEP LINKING INTO A WEB SITE

(75) Inventor: Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 09/587,228

(22) Filed: Jun. 2, 2000

(51) Int. Cl.[7] .................. G06F 15/16; G06F 15/173
(52) U.S. Cl. ................. 709/229; 709/217; 709/225
(58) Field of Search ...................... 709/201, 205, 709/206, 207, 217, 219, 225, 229, 227, 228; 707/104

(56) References Cited

U.S. PATENT DOCUMENTS 5,819,285 A * 10/1998 Damico et al. .......... 707/104.1
6,199,102 B1 * 3/2001 Cobb ......................... 709/206
6,233,618 B1 * 5/2001 Shannon ................... 709/229
6,256,739 B1 * 7/2001 Skopp et al. .............. 709/229
6,539,424 B1 * 3/2003 Dutta ......................... 709/219

* cited by examiner

Primary Examiner—Paul H. Kang
(74) Attorney, Agent, or Firm—Akerman Senterfitt

(57) ABSTRACT

A method for preventing access to a document in a server in a computer communications network can include the step of establishing a list of allowable source documents from which a request to access the document can originate. Furthermore, a request for the document can be received from a requesting client. An identity of a source document of the request can be detected in the request and compared with the list of allowable source documents from which a request to access the document can originate. The request can be serviced if the detected identifier matches an allowable source document contained in the list of allowable source documents. Moreover, the request can be denied if the detected identifier does not match an allowable source document contained in the list of prohibited source documents.

48 Claims, 8 Drawing Sheets

METHOD FOR PREVENTING DEEP LINKING INTO A WEB SITE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates to network based technologies, and more particularly to a method for preventing deep linking to a hypertext document in a hypertext document distribution server.

2. Description of Related Art

The Internet is a set of globally interconnected computers through which multiple users access data and programs from around the world. As an informational sharing mechanism, it comprises a network of networks for interconnecting a plurality of server computers (servers) and a plurality of client computers (clients). The Internet permits a wide variety of communication and informational retrieval mechanisms, including electronic mail (e-mail), File Transfer Protocol (FTP), USENET, and the World Wide Web (Web). Notably, the Web permits users to retrieve and view hypertext document containing not only text, but also pictures, sound, animated images, and video-clips. Moreover, the Web permits user to interact with retrieved hypertext documents.

The Web primarily consists of Web servers and Web browsers. Whereas a Web server hosts hypertext documents, known as Web pages, by storing the Web pages and transmitting those Web pages on command, a Web browser resides on a client computer, and both supplies requests to Web servers for Web pages and displays the retrieved Web pages in a user interface. Each Web page stored in a Web server has associated therewith a Uniform Resource Locator (URL) identifying both a particular domain on the Internet in which the Web server can be located and a location in the Web server where the Web page is stored. The URL permits any given Web page to be distinguished from all other Web pages.

In operation, a Web browser can accept as input a URL of a requested Web page which can be provided by a user through any suitable means, but typically by keyboard or hyperlink. The Web browser can receive the URL and transmit a request for the Web page to a Web server residing at a domain specified in the URL. Upon receiving the request, the Web server can identify in the URL the location of the requested Web page. If the requested Web page resides at the location specified in the URL, the Web server can serve the requested Web page to the requesting client. Subsequently, the Web browser residing in the client can display the requested Web page.

A Web page as described in the foregoing specification can include a document encoded in hypertext markup language (HTML). Notably, HTML permits the embedding of URLs in a Web page. When a URL is embedded in a Web page, upon display of the Web page, a user can select the URL, using for example a mouse pointing device. Upon selecting the URL, a request can be transmitted by the Web browser for the Web page denoted by the embedded URL. In this way, the displayed. Web page is said to have been hyperlinked to the Web page denoted by the embedded URL. In consequence, a user can cause the Web browser to retrieve a Web page not only by explicitly supplying a URL to the Web browser, but also by selecting an embedded URL in a displayed Web page.

URLs embedded in a Web page are traditionally referred to as hyperlinks. Hyperlinks are not merely limited to referencing Web pages. Rather, hyperlinks can reference several types of objects distributed on the Internet. For example, hyperlinks can refer to graphics files, sound files, audio and video recordings, and non-HTML documents, for example portable document format (PDF) documents. Hyperlinks are often displayed in the form of text highlighted in bold-face, different colors or by underlining. Still, the display of hyperlinks are typically not limited in this regard. Rather, hyperlinks can be displayed in the form of a button or graphic that can be "activated" by the click of a mouse pointer.

A hyperlink can refer to almost any other Web page in a Web server on any other domain, including different Web pages stored in the same Web server or in an entirely different Web server. Significantly, Web pages linked by hyperlinks, in of themselves, can include hyperlinks to yet more Web pages thereby interconnecting almost every document posted on the Internet with almost every other document. Thus, by activating different hypertext links to a given Web page, different readers can arrive at the same page by a plurality of routes, each having viewed different Web pages along the way. For example, a user can access any given Web page on the Web by directly typing the corresponding URL into a browser. Alternatively, the same user can access the same Web page by following a series of hyperlinks from other Web pages leading thereto.

Web pages often are grouped in a Web site wherein the Web site can reflect an overall theme. For example, a Web site can include a car rental Web site in which viewers of Web pages in the Web site can survey available rental cars and consummate a rental car transaction. In another example, a Web site can include a corporate marketing Web site in which viewers of Web pages in the Web site can survey various corporate products, location and contact information and press releases relating to the company. As such, typically, Web sites have a preferred entry point referred to as a home page from which a user can access other Web pages in the Web site.

"Deep links" are hyperlinks which can defeat a Web site's intended method of navigation. For example, many Web sites rely upon the home page as an intended initial entry point to the Web pages which comprise the site. The home page can display contextually appropriate information, for example a summary of the Web site, a table of contents, advertisements or written disclaimers. Deep links are hyperlinks specifying a Web page contained in a Web site which normally can be accessed only by first accessing the home page of the Web site. A user performing "deep linking" can bypass the home page and effectively the display of the contextually appropriate information merely by specifying the URL of the interior Web page.

Deep linking has been used in order to perpetrate an illusion that a source or author of an document interior to a Web site is other than its true source. In other words, the hyperlinked content can be made to appear as if coming from other than its true author. Specifically, unauthorized deep links have been embedded in Web pages not associated with the Web site of the deep linked Web page in order to provide a direct point of access to information contained in the Web page referenced by the deep link. With only the URL denoted by the deep link marking the true identity of the deep linked Web page, only the most diligent of users can observe the source of the deep linked Web page. Though several solutions to deep linking have been proposed, for example password protection of Web pages in a Web site, or back-end communication synchronization between Web pages in a Web site, the complexity involved in implementing and maintaining such solutions seldom warrants the use of the same. Thus, a need remains for an effective and efficient method for preventing deep linking in a Web site.

SUMMARY OF THE INVENTION

The invention comprises a method for preventing access to a document, such as a Web page, through undesired deep linking. The method begins by receiving in a server a request for a document. A system for performing the method of the invention authenticates an identifier contained in the request in order to determine whether to service or deny the request for the document. More specifically, the method of the invention can detect within the request the source document of the request by referencing embedded information in a request header contained in the request. The embedded information can be an identifier of the source document, for example a uniform resource locator (URL). Preferably, the URL can be extracted from the request header.

Subsequently, the extracted URL can be compared with an established list or database of source documents represented by their corresponding URLs. Preferably, the list or database of URLs can be stored in a fixed storage memory device such as the hard disk drive of the server hosting the requested document. The list or database of URLs can represent preferred access points for the requested document, whereby the request is serviced only if the referring URL matches one of the URLs in the list or database. Alternatively, the list or database of URLs can represent prohibited access points for the requested document, whereby the request is denied if the referring URL matches one of the URLs in the list or database.

In one alternative embodiment, the server can service the request by serving the requested document. If a request header does not contain a referent URL, as would be the case if a user directly entered a URL on a keyboard, the request might be serviced or not depending on a pre-determined default, for example a default specified by the programmer of the server containing the requested document. The source document of a request for a Web page can be ascertained and compared with a list of preferred or prohibited points of access, appropriate action then being taken based thereupon.

A method for preventing access to a document in a server in a computer communications network can include the step of establishing a list of allowable source documents from which a request to access the document can originate. Furthermore, a request for the document can be received from a requesting client. An identity of a source document of the request can be detected in the request and compared with the list of allowable source documents from which a request to access the document can originate. The request can be serviced if the detected identifier matches an allowable source document contained in the list of allowable source documents. Moreover, the request can be denied if the detected identifier does not match an allowable source document contained in the list of prohibited source documents.

Alternatively, the method for preventing access to a document in a server in a computer communications network can include the step of establishing a list of prohibited source documents from which a request to access the document cannot originate. In the alternative embodiment, a request for the document can be received from a requesting client. An identity of a source document of the request can be detected in the request and compared with the list of prohibited source documents from which a request to access the document cannot originate. The request can be denied if the detected identifier matches a prohibited source document contained in the list of prohibited source documents. Moreover, the request can be serviced if the detected identifier does not match a prohibited source document contained in the list of allowable source documents.

In the preferred embodiment, the request can be a hypertext transfer protocol request. Furthermore, the requested document can be a Web page. Finally, the identity can be represented in a URL. As such, the step of receiving can include receiving the hypertext transfer protocol request from an activated hyperlink in a hypertext source document, the hypertext source document being hypertext linked to the requested document.

The step of detecting can include the steps of: extracting a request header from the request; and, detecting in the request header the identity. Still, a request can be received in which a source document identity is not present in the request header. Therefore, in one embodiment of the method of the invention, the request can be serviced if an identity is not detected in the request. Alternatively, the request can be denied if an identity is not detected in the request.

In servicing a request for a document, the method can include serving the requested document to the requesting client. Likewise, in denying a request for a document, the method can include not serving the requested document to the requesting client. Finally, in an alternative embodiment, in denying a request for a document, the method can include serving a second document to the requesting client in substitute for the requested document. Notably, the second document can be a Web page notifying the requesting client that access has been denied. Alternatively, the second document can be a Web page comprising a preferred point of access to the requested document, for example a home page.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
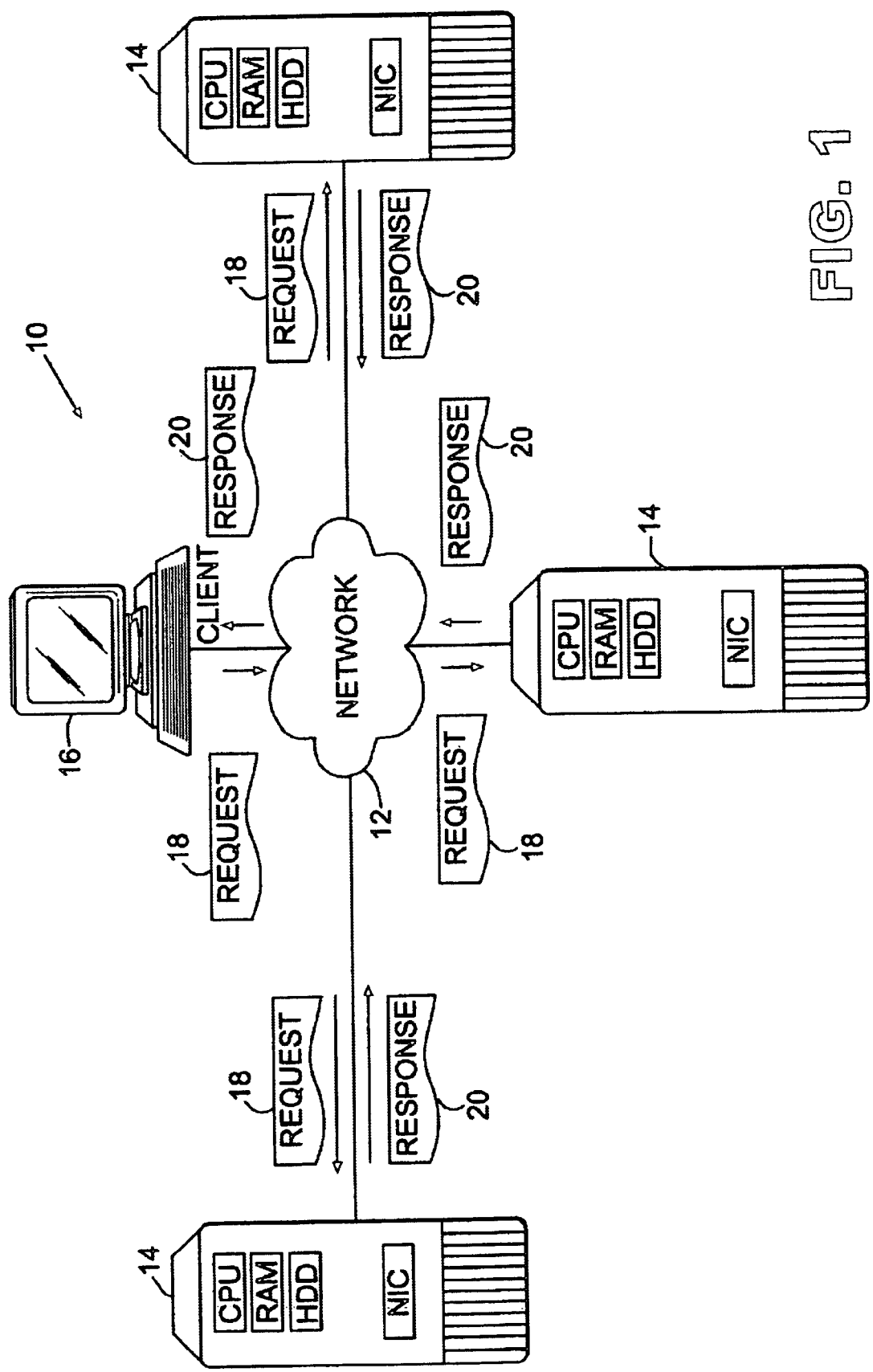
FIG. 1 illustrates a computer network for distributing programs and documents in accordance with a preferred methodology of the present invention.

Referring now to FIG. 1, a typical on-line environment 10 is illustrated in which the method of the present invention can be practiced. This environment 10 comprises a computer communication network 12 interconnecting servers 14 and clients 16, although only a single client 16 is shown in the figure for ease of illustration. Typically, however, the environment 10 could potentially comprise millions of clients 16 and servers 14.

The computer communications network 12 can be any non-publically accessible network such as a LAN (local area network) or WAN (wide area network), or preferably, the Internet. The interconnections between the servers 14 and clients 16 can be thought of as virtual circuits that are established between the servers 14 and the clients 16 for the express purpose of communication. Each client 16 can establish a connection with a server 14 in order to transmit a request 18 for a document stored in the server 14 via the computer communications network 12. Servers 14 can accept connections from clients 16 in order to service transmitted requests 18 for documents. Additionally, servers 14 can service transmitted requests 18 by sending responses 20 back to the requesting clients 16 via the computer communications network 12.

Typically, a response 20 can be a document, for example a requested Web page. However, the invention is not limited in this regard. Rather, the response 20 can be a notification to the requesting client 14 on the status of the request 18, for example "HTTP 404 - Not Found". Additionally, the response 20 is not limited to a document, but the response 20 can be any requested information, for example an audio clip. Notably, servers 14 or clients 16, alone, can function as both a server 14 and a client 16. Hence, the use of these terms in the remainder of the foregoing specification are intended to refer only to the role being performed relative to a particular connection, not to either's capabilities in general.

Figure 2:
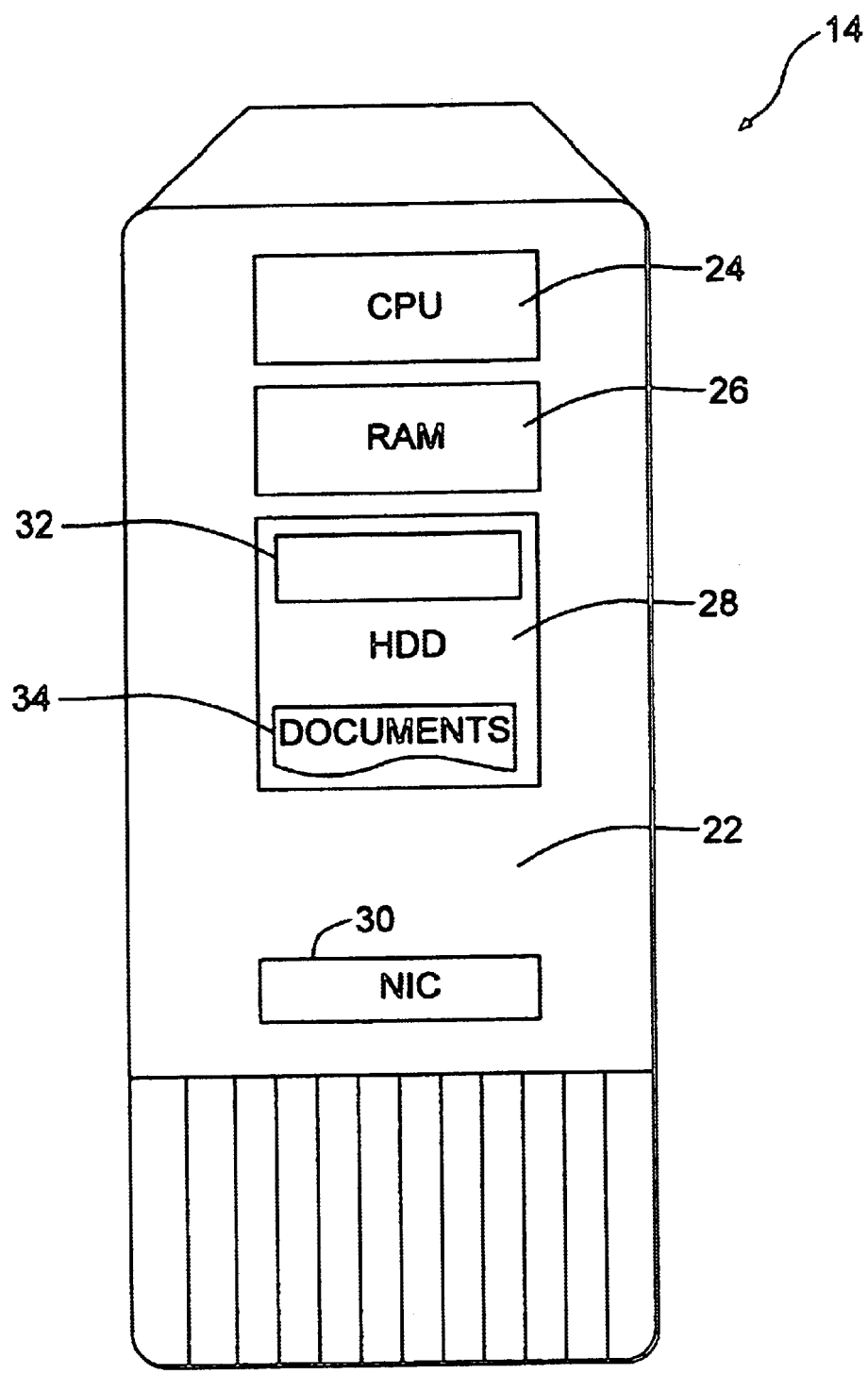
FIG. 2 is a simplified diagram of a Web server, suitable for use in the method of the present invention.

As shown now in FIG. 2, each server 14 preferably comprises a computer 22 having therein a central processing unit (CPU) 24, an internal memory device 26 such as a random access memory (RAM), and a fixed storage 28 such as a hard disk drive (HDD). The server 14 also includes network interface circuitry (NIC) 30 for communicatively connecting the computer 22 to the computer communications network 12. Optionally, the computer 22 can further include a keyboard (not shown) and at least one user interface display unit (not shown) such as a video display terminal (VDT) operatively connected thereto for the purpose of interacting with the computer 22. However, the invention is not limited in this regard. Rather, the computer 22 requires neither a keyboard nor a VDT in order to suitably operate according to the inventive arrangements.

The CPU 24 can comprise any suitable microprocessor or other electronic processing unit, as is well known to those skilled in the art. Examples of a suitable CPU can include an Intel Pentium™ class processor, an IBM PowerPC™ class processor or an AMD Athlon™ class processor. The fixed storage 28 can store therein each of an operating system 32 and a hypertext document 34 that defines a plurality of Web pages that will comprise a Web site hosted by the server 14. The various hardware requirements for the computer 22 as described herein can generally be satisfied by any one of many commercially available high speed network servers, for example those manufactured by International Business Machines Corporation of Armonk, N.Y.

Figure 3:
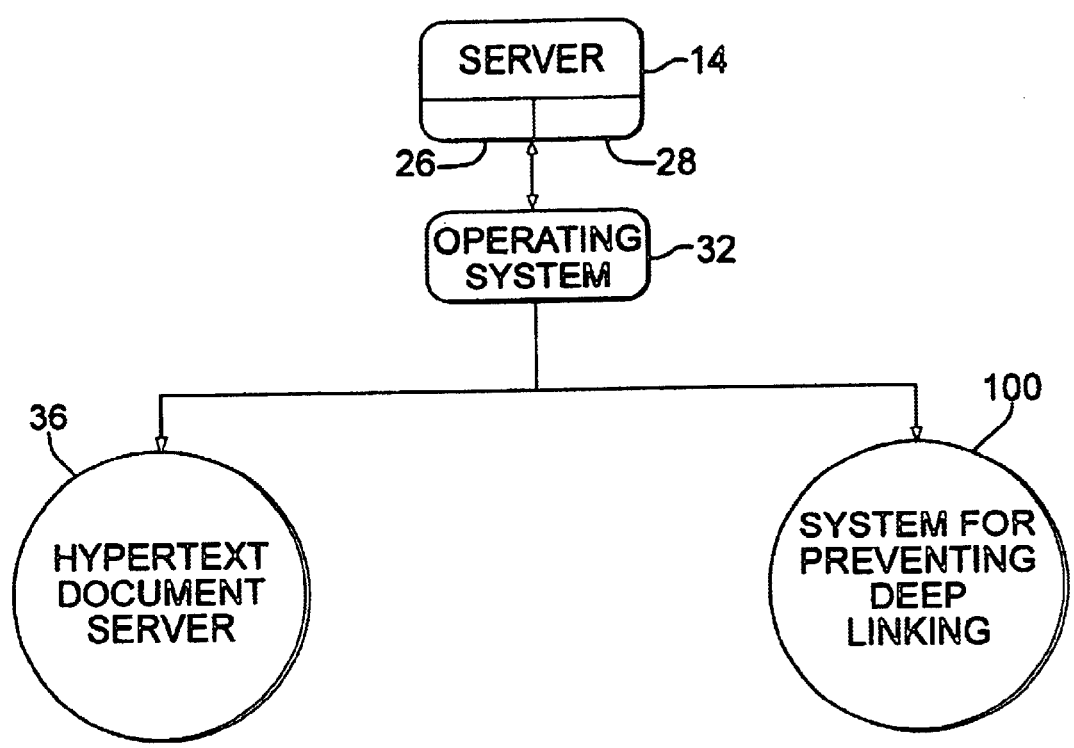
FIG. 3 is a block diagram of a system architecture for use in the Web server of FIG. 2.

FIG. 3 illustrates a preferred system architecture for use in the server 16 of FIG. 2. Server 14 can include in fixed storage 28 each of an operating system 32, a hypertext document server 36 and a System for Preventing Deep Linking 100. Notably, FIG. 3 depicts each of the operating system 32, the hypertext document server 36 and the System for Preventing Deep Linking 100 as separate applications programs. Notwithstanding, the invention is not limited in this regard. Rather each can be combined with another to form a more complex, composite applications program.

Upon initialization of the server 14, the server 14 can load into memory 26 the operating system 32. In addition, the hypertext document server 36 can be loaded into memory 26 and subsequently executed. Notably, if the System for Preventing Deep Linking 100 is implemented as an applications program separate from the hypertext document server 36, then the System for Preventing Deep Linking 100, too, can be loaded into memory 26 and subsequently executed.

In a preferred embodiment which shall be discussed herein, operating system 32 is one of the Windows family of operating systems, such as Windows NT or Windows which are available from Microsoft Corporation of Redmond, Washington. However, the system is not limited in this regard, and the invention can also be used with any other type of computer operating system, for example the Linux operating system. Also in the preferred embodiment, the hypertext document server 36 is a Web server. More particularly, the Web server is Internet Information Server manufactured by Microsoft Corporation of Redmond, Wash. Still, other Web servers can suffice, for example the open source Apache Web Server. Finally, the System for Preventing Deep Linking 100 can be implemented by a programmer of ordinary skill in the art by employing well-known computer communications methods, for example methods relating to the TCP/IP communications protocol. Those methods can be implemented and incorporated into the System for Preventing Deep Linking 100 using commercially available development tools for the operating systems described above.

Similar to the server 14, clients 16 interacting with the System for Preventing Deep Linking also preferably comprise a computer 22 having a CPU 24, an internal memory device 26, fixed storage 28, and network interface circuitry 30, substantially as described above. In addition, the computer 22 of the client 16 preferably comprises a browser application that is preferably stored in the fixed storage 28 and can be loaded into the internal memory device 26 upon initialization. The browser preferably permits the client 16 to send and receive requests for documents 18 to and from the servers 14 via the computer communications network 12.

In a preferred embodiment, clients 16 can transmit requests 18 for Web pages to the servers 14 using the hypertext transfer protocol (HTTP). HTTP is described in substantial detail in the request for comment, RFC 2068. RFCs are published by the RFC Editor. Additionally, the Internet Engineering Task Force maintains a repository of all RFCs including RFC 2068. Thus, RFC 2068 can be downloaded from the Internet Engineering Task Force Web server having the URL http:l/www.ietf.org/rfc.html and is incorporated herein by reference. As described in RFC 2068, a request message from a client to a server can take the form of "Request=Request-Line" and can include within the first line of that message, the method to be applied to the resource, the identifier of the resource, and the protocol version in use. The Request-Line can begin with a method token, followed by the Request-URI and the Protocol Version, and ends with carriage return and a line-feed. The elements are separated by space characters. No carriage returns or line feeds are permitted except in the final carriage retrun, line feed sequence. Request-Line= Method <space>

Request-URI <space> HTTP-Version CRLF. The Method token indicates the method to be performed on the resource identified by the Request-URI. Acceptable methods can include "OPTIONS", "GET", "HEAD", "POST", "PUT", "DELETE" and "TRACE".

In response to the requests 18, servers 14 can service the requests 18, for instance by transmitting requested Web pages to the requesting clients 16. More particularly, the hypertext document server 36 in the server 14 can respond to requests 18 for hypertext documents 34 received at the server 14 and communicated to the hypertext document server 36 through the operating system 32. Significantly, the server 14, upon receiving a request 18 for a hypertext document 34, can pass the request 18 to the System for Preventing Deep Linking 100, whether the System for Preventing Deep Linking 100 is external or internal to the hypertext document server 36. As will be elaborated upon, the System for Preventing Deep Linking 100 can determine whether to service or deny the request 18 based upon the source of the request 18.

Figure 4:
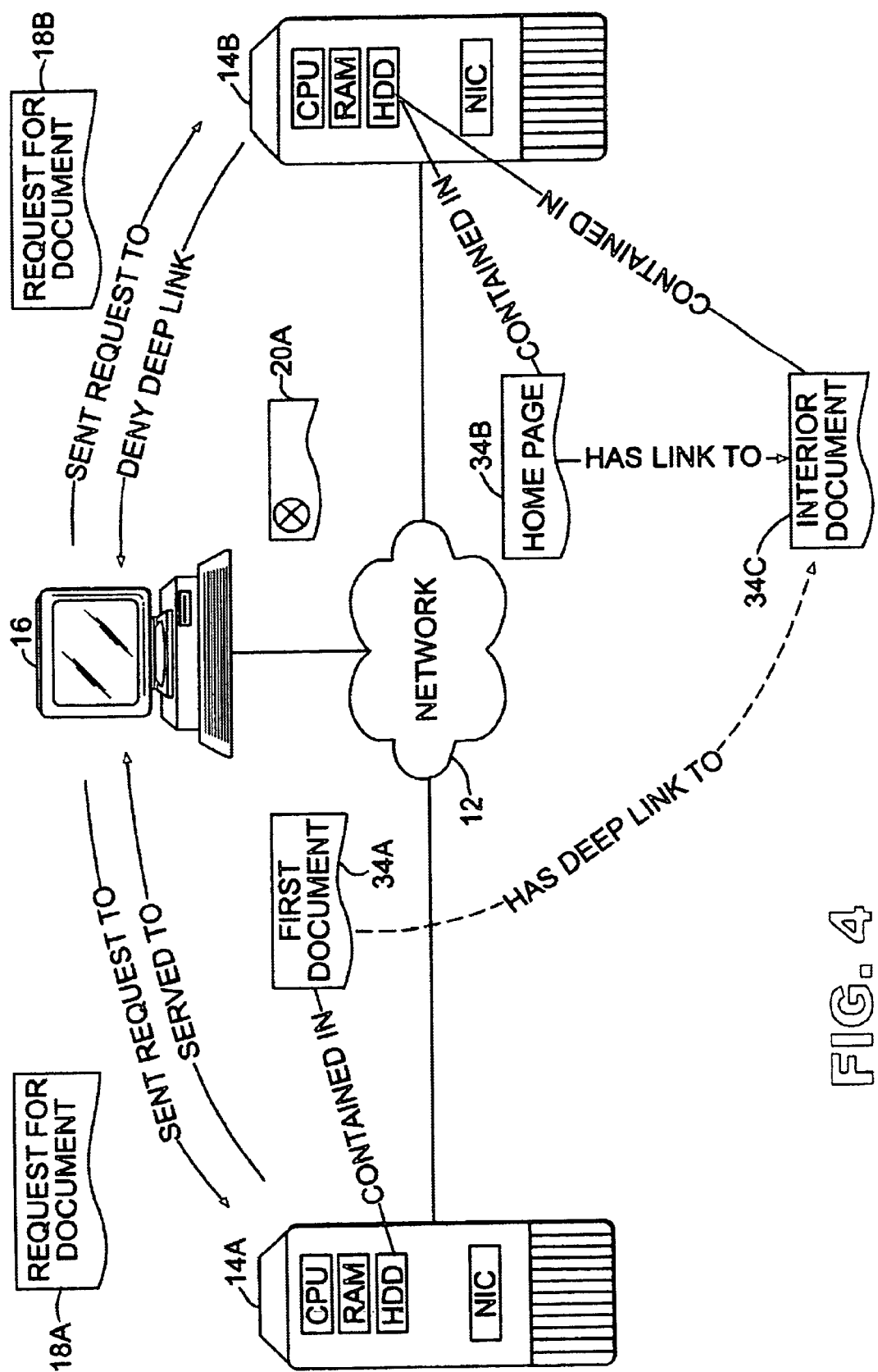
FIG. 4 is a schematic illustration of a preferred method for preventing deep linking performed by the system of FIG. 3.

Referring now to FIG. 4, a schematic illustration of a preferred method of the invention performed by the System for Preventing Deep Linking 100 of FIG. 3 is depicted. More specifically, in the preferred embodiment, a requesting client 16 can transmit a first request 18A to a first Web server 14A for a Web page 34A residing on that server 14A. In accordance with the request protocol specified-in RFC 2068, an example of a suitable request 18A sent to the first Web server 14A can include:

GET http://www.w3. orglpub/WWW/TheProject.html HTTP/1.1. where GET is the method token, http://www.w3.org/pub/lWW/TheProject.html is the Request-URI and HTTP/1.1 is the Protocol Version. Notably, within the Request-URI, the domain of the requested Web page, is "w3.org", the location of the requested Web page in the Web server is "/pub/WWW" and the Web Page itself is "TheProject.html".

After receiving the request 18A, the first Web server 14A can identify whether the requested Web page 34A is stored in the first server 14A. If the requested Web page 34A is stored in the first Web server 14A, the first Web server 14A can transmit the requested Web page 34A to the requesting client 16A. If the requested Web page 34A is not available, the first Web server 14A can notify the requesting client 16A that the requested Web page 34A was not found. Still, for illustrative purposes, it is assumed that the first Web server 14A can provide the requested Web page 34A to the requesting client 16A.

In the example shown in the figure, it is further assumed that the requested Web page 34A provided to the requesting client 16A contains a hyperlink to an interior Web page 34C in a second Web server 14B. Hence, the hyperlink is a deep link. By clicking on the hyperlink embedded in the requested Web page 34A, the requesting client 16A can cause the transmission of a second request 18B to the second Web server 14B. Still, in the Web site defined by the interior Web page 34C and the home page 34B, the home page 34B is the preferred point of entry to the Web site. Thus, the behavior exhibited in FIG. 4 represents deep linking. In the preferred embodiment, deep linking can be prevented by passing the request to the System for Preventing Deep Linking 100.

More particularly, in the preferred embodiment, the second Web server 14B can receive the second request and identify therein the identity of the requested Web page, in this case the interior Web page 34C, and further the identity of the source domain from which the request had been generated. Specifically, as disclosed in RFC 2068, the header transmitted with a request 18B can contain embedded therein a start-line, one or more header fields, an end of line indicator, for example an empty line having a carriage return, line feed sequence, and an optional message body. The header fields can include general headers, request headers, response headers, and entity headers. Preferably, general headers are sent first, followed by request headers and response headers, and ending with entity headers.

In general, as disclosed in RFC 2068, a request header can specify the address of the source from which a request is obtained. The request header permits Web servers to identify the source of the request. For example, as shown in FIG. 4, the source of request 18B is the referring document 34A containing therein the deep link to the interior Web page 34C. Alternatively, but not shown in the figure, the source of a request can be an e-mail message having embedded therein a hypertext link, or a user input obtained by typing the text of a URL of the requested Web page. Thus, the content of a request header can be used to determine the source document of a hyperlink-activated request.

Returning now to FIG. 4, upon receiving the request 18B for the interior Web page 34C, the System for Preventing Deep Linking 100 can extract from the request 18B a request header identifying the first Web page 34A as the source of the request. The System for Preventing Deep Linking 100 can further consult a table of permitted sources and, depending upon the contents of the table, can permit or deny access to the requested interior Web page 34C. An exemplary table follows:

| Source Document | Action |
|---|---|
| www.oksource.com/somewebpage.html | permit |
| www.badsource.com/deeplinker.html | deny |

As shown in FIG. 4, since the request 18B originated not from the home page 34B, but from the first Web page 34A, the request 18B can be denied by returning response 20A which can contain a denial message.

Figure 5A:
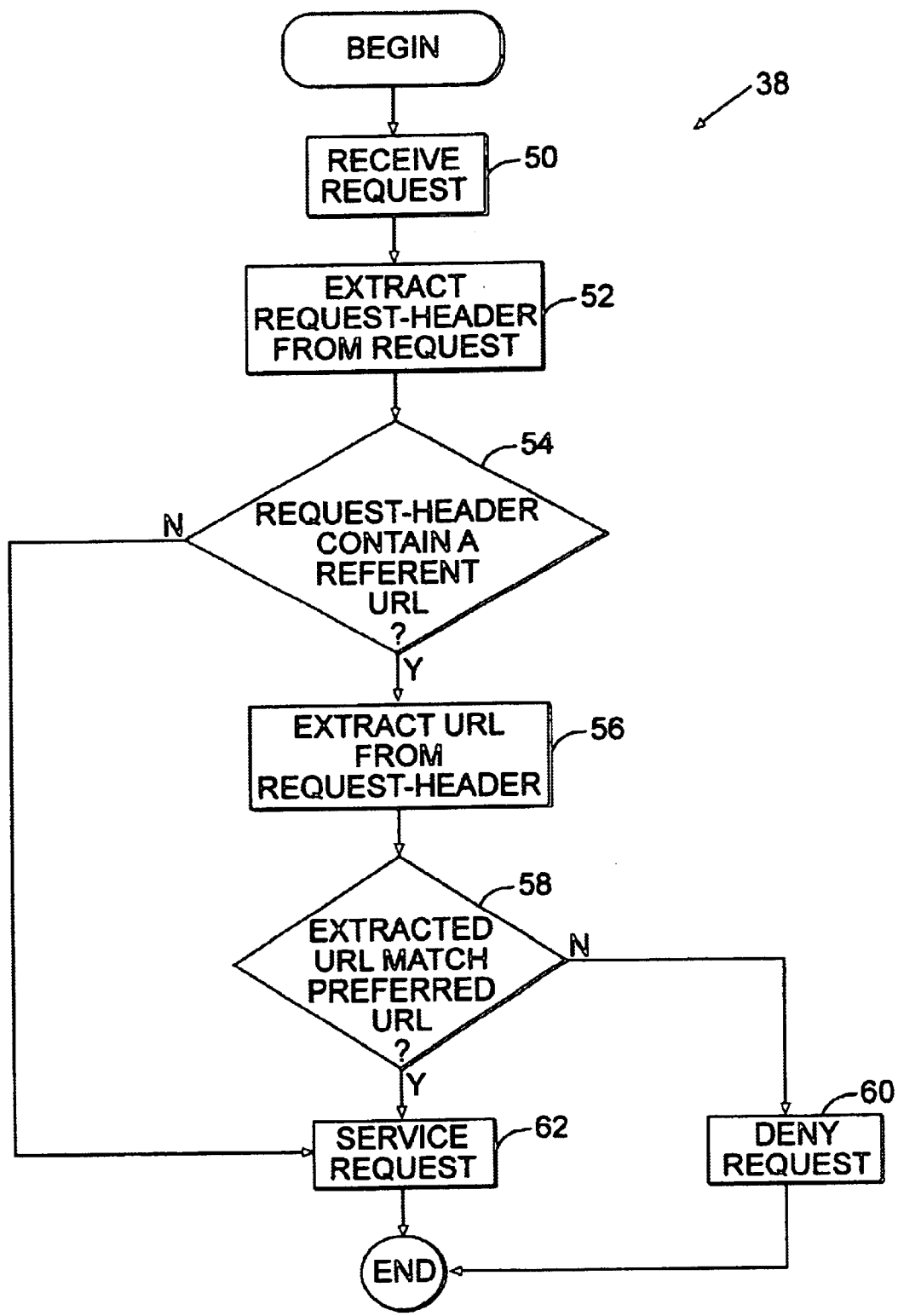
FIGS. 5A through 5D are simplified flow charts of various preferred embodiments for implementing the method of the present invention.

FIG. 5A illustrates an embodiment of the method of the invention performed in the System for Preventing Deep Linking 100. Referring now to FIG. 5A, an embodiment of the method of the present invention is depicted, in which a server 14 receives a request 18 from a client 16 at step 50. At step 52, the server 18 extracts a request header from the request 18. In step 54, the request header is searched for the presence or absence of a referent URL, suggesting whether or not the request 18 originated from another Web page. If the request header contains a referent URL, control branches from step 54 to step 56, in which case the URL is extracted from the request header. If, on the other hand, the request header does not contain a URL, control branches from step 54 to step 62, in which case the request 18 is serviced, as the request 18 may have come from a user input directly obtained by typing a URL at a user's keyboard.

After the URL is extracted from the request header in step 56, the extracted URL is, in step 58, matched against a preferred list of URLs preferably stored in the fixed storage 28 of the server 14. When comparing two URLs to decide if they match or not, a server 14 preferably uses a case-sensitive octet-by-octet comparison of the entire URLs, with a few general exceptions: 1) a port that is empty or not given is equivalent to the default port for that URL; 2) comparisons of host names are case-insensitive; 3) comparisons of scheme names are case-insensitive; and 4) an empty abs_ path is equivalent to an abs_path of "/". Characters other than those in what are referred to as the "reserved" and "unsafe" sets are equivalent to their ""%" HEX HEX" encodings. For example, the following three URLs would preferably be considered a "match":

http://abc.com:80/~ smith/home.html
http://ABC.com/%7Esmith/home.html
http://ABC.com:/%7esmith/home.html In step 58, if a match is found, control passes from step 58 to step 62 in which case the request 18 can be serviced. Preferably, a request 18 is serviced by transmitting, or serving, the requested Web page. Otherwise, if a match is not found, control passes from step 58 to step 60 in which case the request 18 can be denied. By denying the request 18, the server 14 can be programmed to not serve the interior Web page. Optionally, the server 14, upon denying a request 18 in step 60, can send a denial message in the form of a Web page to the client 16. Finally, the server 14 optionally can transmit an alternative Web page, for example the server's 14 intended reference document such as a home page.

This denial of service provides the server 14 with the ability to prevent an interior Web page from being deep linked to by any document not having a URL in the requested header that matches a one of the preferred URLs contained in the table. This has the practical effect of making an interior document 34C not publically accessible unless and until a client 16 comes through an intended reference document 34B, and preferably, the list of preferred URLs includes a list of acceptable Web pages from which the second server 14B will honor requests 18B for internal documents 34C residing in the fixed storage 28 thereof.

Figure 5B:
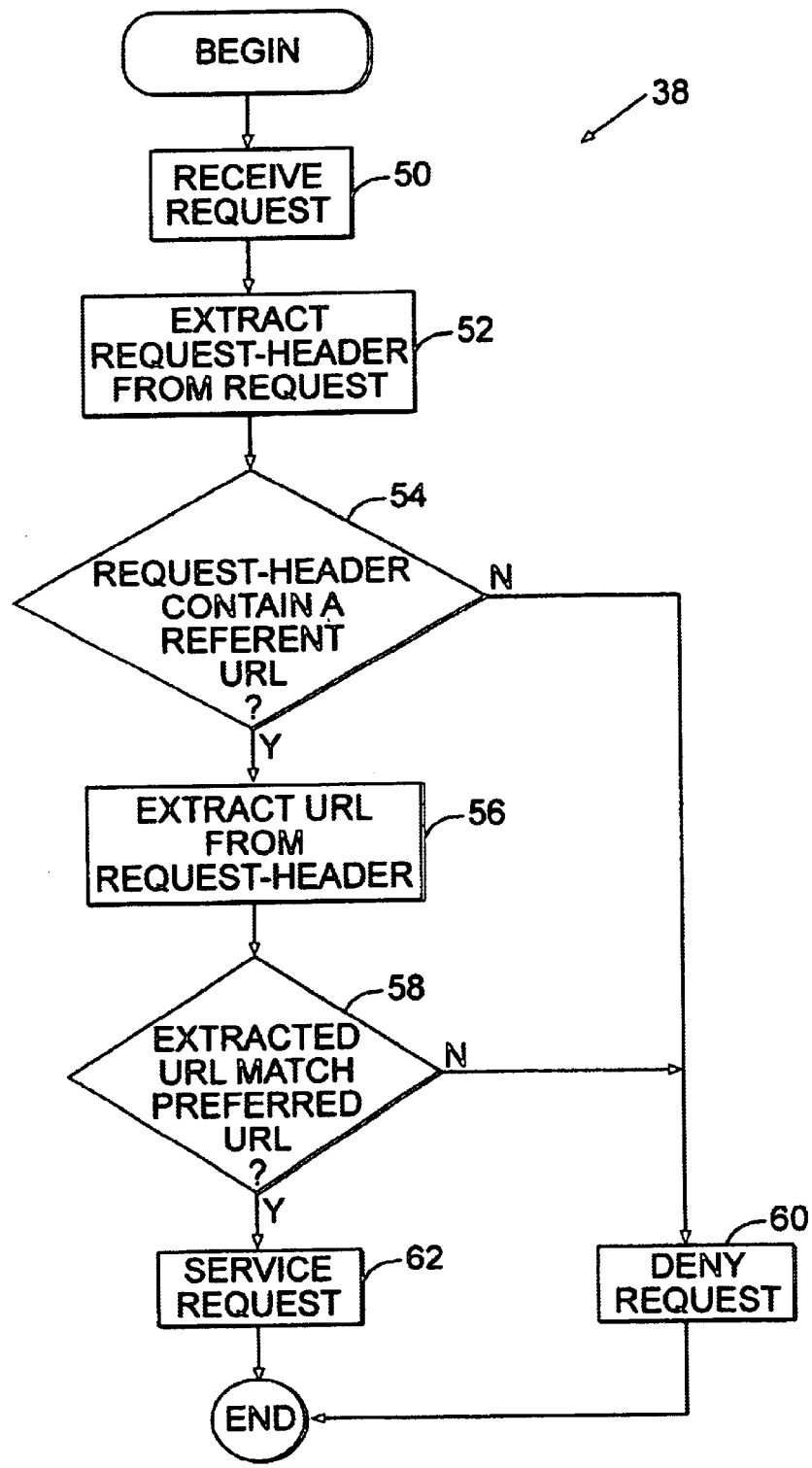
Figure 5C:
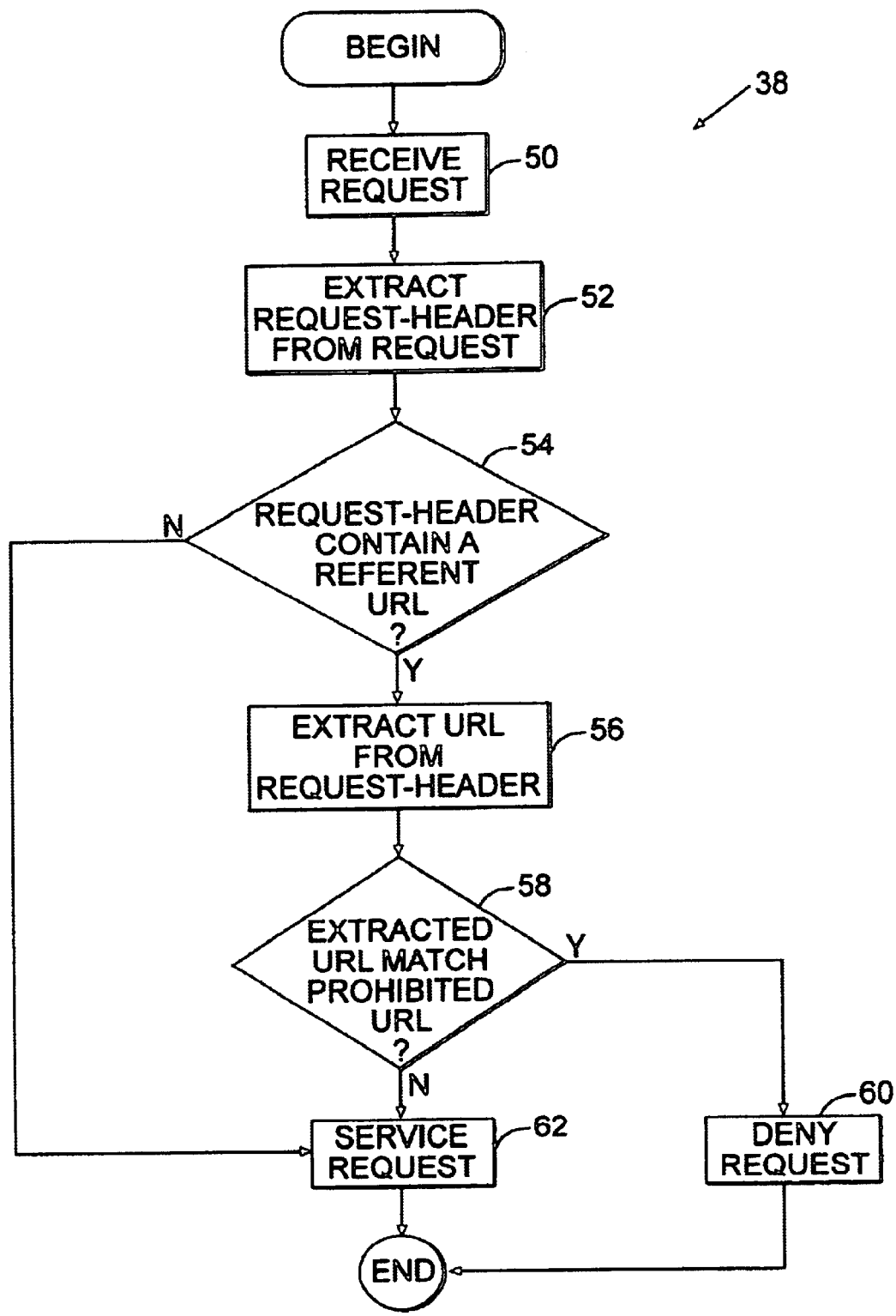
Figure 5D:
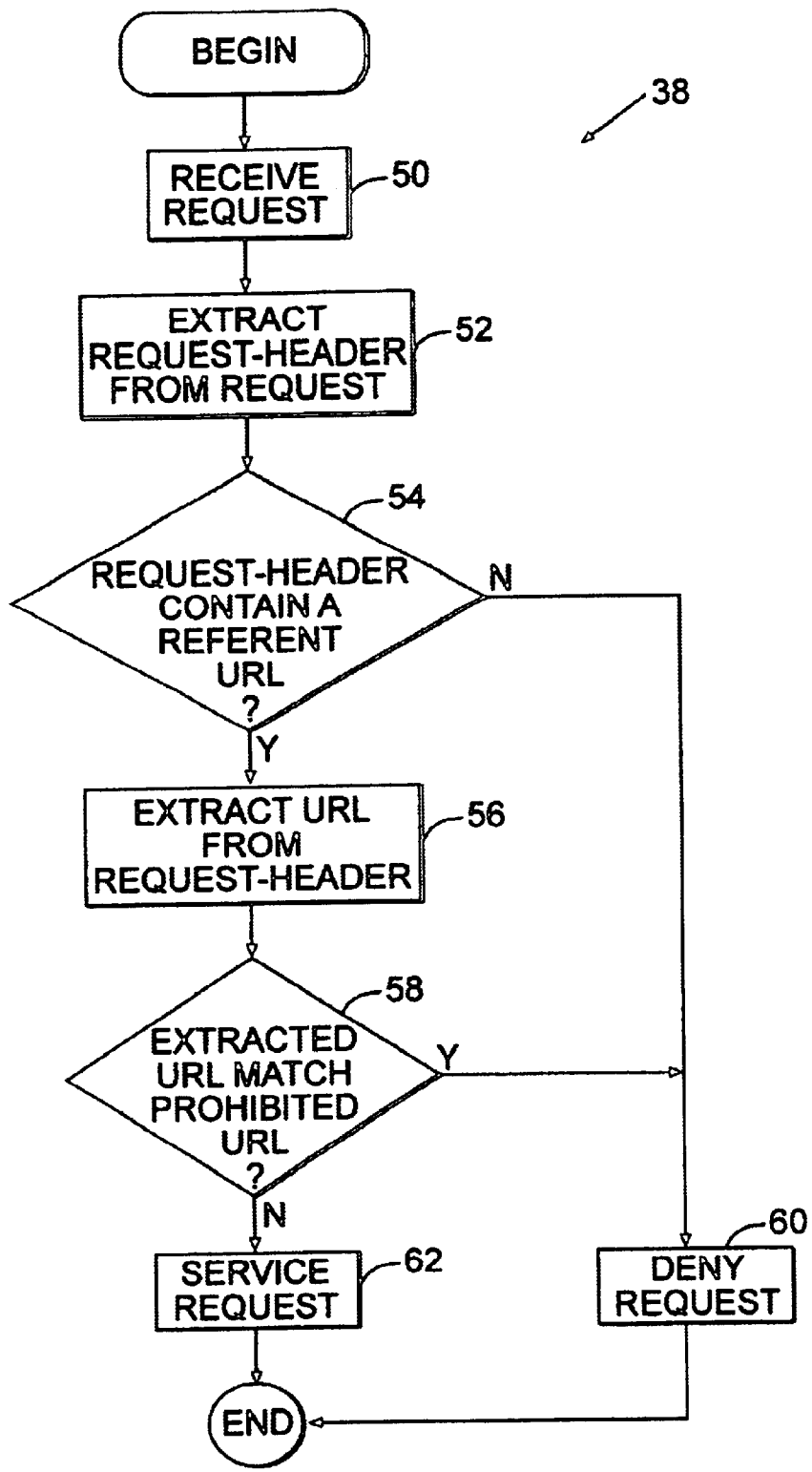

After the request 18 has been either denied in step 60 or serviced in step 62, the method ends thereafter. However, the embodiment described above is not intended to be limiting. For example, as shown in FIGS. 5B and 5D, the server 14 can be programmed to deny the request 18 if the request header does not contain a URL in step 54, or to maintain a list or database or other of prohibited URLS, thereby denying the request 18 if a match is found in step 58, as shown representatively in FIGS. 5-C and 5-D, all other steps all being performed substantially and interchangeably as described in conjunction with FIG. 5-A.

The spirit of the present invention is not limited to any embodiment described above. Rather, the details and features of an exemplary embodiment were disclosed as required. Without departing from the scope of this invention, other modifications will therefore be apparent to those skilled in the art. Thus, it must be understood that the detailed description of the invention and drawings were intended as illustrative only, and not by way of limitation.

What is claimed is:

1. A method for preventing access to a document in a server in a computer communications network, said method comprising the steps of:

establishing a list of allowable source documents from which a request to access said document can originate;

receiving a request for said document form a requesting client;

detecting in said request an identity of a source document of said request;

comparing said detected identity with said list of allowable source documents form which a request to access said document can originate; and, servicing said request if said detected identity matches an allowable source document contained in said list of allowable source documents.

2. The method as recited in claim 1, further comprising the step of:

denying said request if said detected identity does not match an allowable source document contained in said list of allowable source documents.

3. The method as recited in claim 1, wherein said request is a hypertext transfer protocol request.

4. The method as recited in claim 3, wherein said step of receiving comprises the step of:

receiving said hypertext transfer protocol request from an activated hyperlink in a hypertext source document, said hypertext source document being hypertext linked to said requested document.

5. The method as recited in claim 1, wherein said step of detecting comprises steps of:

extracting a request header from said request; and, detecting in said request header said identity.

6. The method as recited in claim 1, wherein said identity is expressed in a uniform resource locator.

7. The method as recited in claim 1, wherein said requested document is a Web page.

8. The method as recited in claim 1, further comprising the step of:

servicing said request if an identity is not detected in said request.

9. The method as recited in claim 1, further comprising the step of:

denying said request if=identity is not detected in said request.

10. The method as recited in claim 1, wherein said step of servicing said request comprises the step of:

servicing said requested document to said requesting client.

11. The method as recited in claim 2, wherein said step of denying said request comprises the step of:

not serving said requested document to said requesting client.

12. The method as recited in claim 2, wherein said step of denying said request comprises the step of:

serving a second document to said requesting client in substitute in said requested document.

13. A method for preventing access to a document in a server in a computer communications network, said me comprising the steps of:

establishing a list of prohibited source documents from which a request to access said document cannot originate;

receiving a request for said document from a requesting client;

detecting in said request an identity of a source document of said request;

comparing said detected identity with said list of prohibited source documents from which a request to access said document cannot originate; and, denying said request if said detected identity does matches a prohibited source document contained in said list of prohibited source documents.

14. The method as recited in claim 13, further comprising the step of:

servicing said request if said detected identity does not match a prohibited source document contained in said list of prohibited source documents.

15. The method as recited in claim 13, wherein said request is a hypertext transfer protocol request.

16. The method as recited in claim 15, wherein said step of receiving comprises the step of:

receiving said hypertext transfer protocol request from an activated hyperlink in a hypertext source document, said hypertext source document being hypertext linked to said requested document.

17. The method as recited in claim 13, wherein said step of detecting comprises the steps of:

extracting a request header from said request; and, detecting in said request header said identity.

18. The method as recited in claim 13, we said requested document is a Web page.

19. The method as recited in claim 13, wherein said identity is expressed in a uniform resource locator.

20. The method as recited in claim 13, further comprising the step of:

servicing said request if an identity is not detected in said request.

21. The method as recited in claim 13, further comprising the step of:

denying said request if an identity is detected in said request.

22. The method as recited in claim 14, wherein said step of servicing said request comprises the step of:

serving said requested document to said requesting client.

23. The method as recited in claim 13, wherein said step of denying said request comprises the step of:

not serving a requested document to said requesting client.

24. The method as recited in claim 13, wherein said step of denying said request comprises the step of:

serving a second document to said requesting client in substitute for said requested document.

25. A machine readable storage having stored thereon a computer program for preventing access to a document in a server in a computer communications network, said computer program having a plurality of code sections executable by a machine for causing the machine to perform the steps of:

establishing a list of allowable source documents from which a request to access said document can originate;

receiving a request for said document from a requesting client;

detecting in said request an identity of a source document of said request;

comparing said detected identity with said list of allowable source documents from which a request to access said document can originate; and, servicing said request if said detected identity matches an allowable source document contained in said list of allowable source documents.

26. The machine readable storage as recited in claim 25, for further causing the machine to perform the step of:

denying said request if said detected identity does not match an allowable source document contained in said list of allowable source documents.

27. The machine readable storage as recited in claim 25, wherein said request is a hypertext transfer protocol request.

28. The machine readable storage as recited in claim 27, wherein said step of receiving comprises th step of:

receiving said hypertext transfer protocol request from an activated hyperlink in a hypertext source document, said hypertext source document being hypertext linked to said requested document.

29. The machine readable store as recited in claim 25, wherein said step of detecting comprises the steps of:

extracting a request header from said request; and, detecting in said request header said identity.

30. The machine readable storage as recited i claim 25, wherein said identity is expressed in a uniform resource locator.

31. The machine readable storage as recited in claim 25, wherein said requested document is a Web page.

32. The machine readable storage as recited in claim 25, for further causing the machine to perform the steps of:

servicing said request if an identity is not detected in said request.

33. The machine readable storage as recited in claim 25, for further causing the machine to perform the steps of:

denying said request if an identity is not detected in said request.

34. The machine readable storage as recited in claim 25, wherein said step of servicing said request comprises the step of:

serving said requested document to said requesting client.

35. The machine readable storage as recited in claim 26, wherein said step of denying said request comprises the step of:

not serving said requested document to said requesting client.

36. The machine readable storage as recited in claim 26, wherein said step of denying said request comprises the step of:

serving, a second document to said requesting client in substitute for said requested document.

37. A machine readable storage, having stored thereon a computer program for preventing access to a document in a server in a computer communications network, said computer program having a plurality of code sections executable by a machine for causing the machine to perform the steps of:

establishing a list of prohibited source documents from which a request to access said document cannot originate;

receiving a request for said document from a requesting client;

detecting in said request an identity of a source document of said request;

comparing said detected identity with said list of prohibited source documents from which a request to access said document cannot originate; and, denying said request if said detected identity does matches a prohibited source document contained in said list of prohibited source documents.

38. The machine readable storage as recited in claim 37, further comprising the step of:

servicing said request if said detected identity docs not match a prohibited source document contained in said list of prohibited source documents.

39. The machine readable storage as recited in claim 37, wherein said request is a hypertext transfer protocol request.

40. The machine readable storage as recited in claim 39, wherein said step of receiving comprise the step of:

receiving sad hypertext transfer protocol request from an activated hyperlink in a hypertext source document said hypertext source document being hypertext linked to said requested document.

41. The machine readable storage as recited in claim 37, wherein said step of detecting comprises the steps of:

extracting a request header from said request; and, detecting in said request header said identity.

42. The machine readable storage as recited in claim 37, wherein said requested document is a Web page.

43. The machine readable storage as recited in claim 37, wherein said identity is expressed in a uniform resource locator.

44. The machine readable storage as recited in claim 37, further comprising the step of:

servicing said request if an identity is not detected in said request.

45. The machine readable storage as recited in claim 37, further comprising the step of:

denying said request if an identity is detected in said request.

46. The machine readable storage as recited in claim 38, wherein said step of servicing said request comprises the step of:

serving said requested document to said requesting client.

47. The machine readable storage as recited in claim 37, wherein said step of denying said request comprises the step of:

not serving said requested document to said requesting client.

48. The machine readable storage as recited in claim 37, wherein said step of denying said request comprises the step of:

serving a second document to said requesting client in substitute for said requested document.

* * * * *